(12) United States Patent
Wu et al.

(10) Patent No.: US 8,582,313 B2
(45) Date of Patent: Nov. 12, 2013

(54) MOTHERBOARD ASSEMBLY HAVING SERIAL ADVANCED TECHNOLOGY ATTACHMENT DUAL IN-LINE MEMORY MODULE

(75) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 162 days.

(21) Appl. No.: 13/217,638

(22) Filed: Aug. 25, 2011

(65) Prior Publication Data
US 2013/0039016 A1    Feb. 14, 2013

(30) Foreign Application Priority Data

Aug. 10, 2011    (CN) .......................... 2011 1 0228499

(51) Int. Cl.
*G06F 1/16*    (2006.01)
(52) U.S. Cl.
USPC .......................................... 361/760; 361/735

(58) Field of Classification Search
USPC ............... 361/679.31, 679.32, 735, 785, 791, 361/760, 801; 439/65
See application file for complete search history.

(56) References Cited

U.S. PATENT DOCUMENTS

| | | | |
|---|---|---|---|
| 2007/0245076 A1* | 10/2007 | Chang et al. ................... | 711/112 |
| 2012/0159045 A1* | 6/2012 | Hinkle et al. ................. | 711/103 |
| 2013/0016471 A1* | 1/2013 | Chen ......................... | 361/679.31 |
| 2013/0038997 A1* | 2/2013 | Tian et al. ................ | 361/679.31 |
| 2013/0070412 A1* | 3/2013 | Ge et al. ................... | 361/679.32 |

* cited by examiner

*Primary Examiner* — Bernard Rojas
(74) *Attorney, Agent, or Firm* — Altis & Wispro Law Group, Inc.

(57) ABSTRACT

A motherboard assembly includes a motherboard with a memory slot, an adapter board, and a serial advanced technology attachment dual-in-line memory module (SATA DIMM) with a circuit board and a connector. An edge connector is set on a bottom edge of the circuit board. The adapter board includes a SATA interface, a hard disk drive (HDD) signal multiplier, a power interface, and an expansion SATA interface. The edge connector is connected to the memory slot and the connector is connected to the expansion SATA interface, to enable the motherboard communication with SATA DIMM modules, which are connected to the memory slots.

8 Claims, 4 Drawing Sheets

MOTHERBOARD ASSEMBLY HAVING SERIAL ADVANCED TECHNOLOGY ATTACHMENT DUAL IN-LINE MEMORY MODULE

BACKGROUND

1. Technical Field

The present disclosure relates to a motherboard assembly with a serial advanced technology attachment dual in-line memory module (SATA DIMM).

2. Description of Related Art

Solid state drives (SSD) store data on chips instead of on magnetic or optical discs. One type of SSD has the form factor of a DIMM module and it is called a SATA DIMM module. The SATA DIMM module can be inserted into a memory slot of a motherboard, to receive voltages from the motherboard through the memory slot and receive hard disk drive (HDD) signals through SATA connectors arranged on the SATA DIMM module and connected to a SATA connector of the motherboard. However, these SATA connectors are arranged on the motherboard and occupy precious space. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
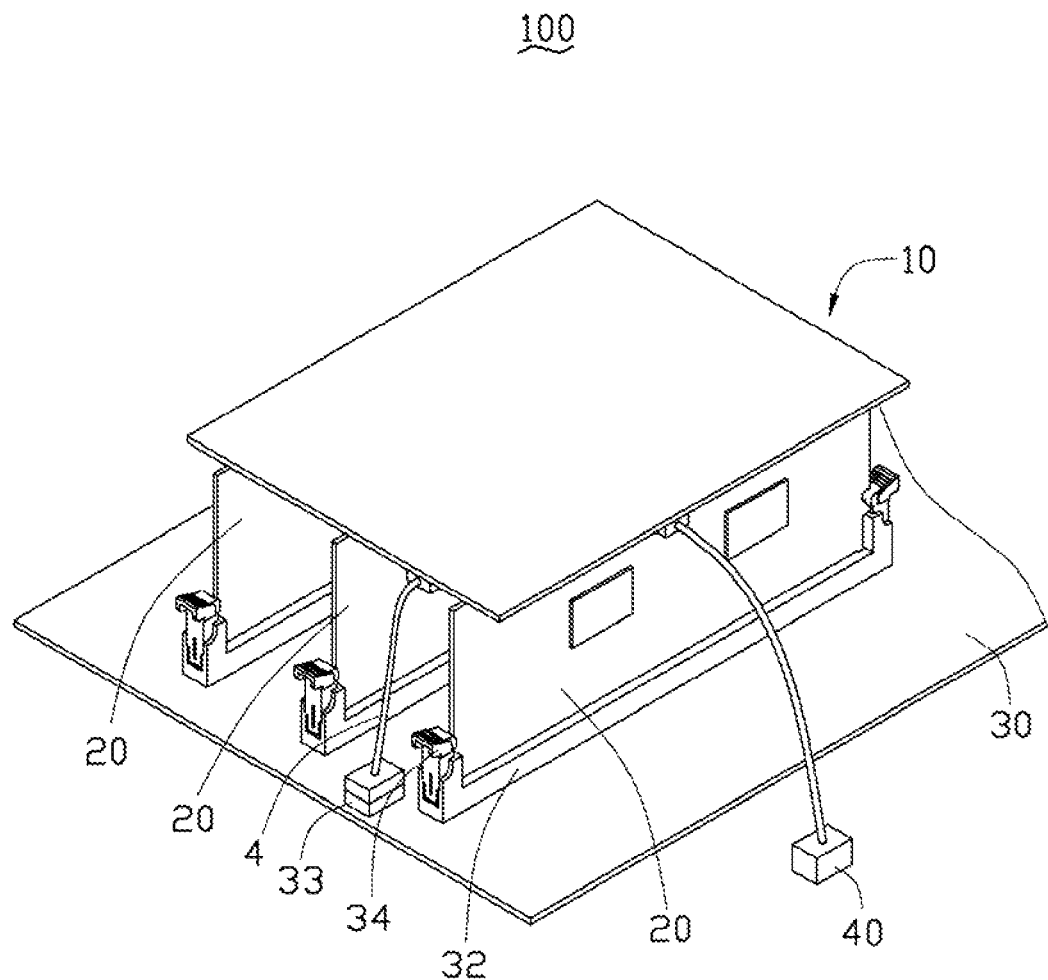
FIG. 1 is a schematic view of an embodiment of a motherboard assembly, wherein the motherboard assembly includes a motherboard, an adapter board, and a serial advanced technology attachment dual in-line memory module (SATA DIMM).

Referring to FIG. 1, a motherboard assembly 100 in accordance with an exemplary embodiment includes a motherboard 30, an adapter board 10, and a plurality of serial advanced technology attachment dual in-line memory modules (SATA DIMMs) 20.

Figure 2:
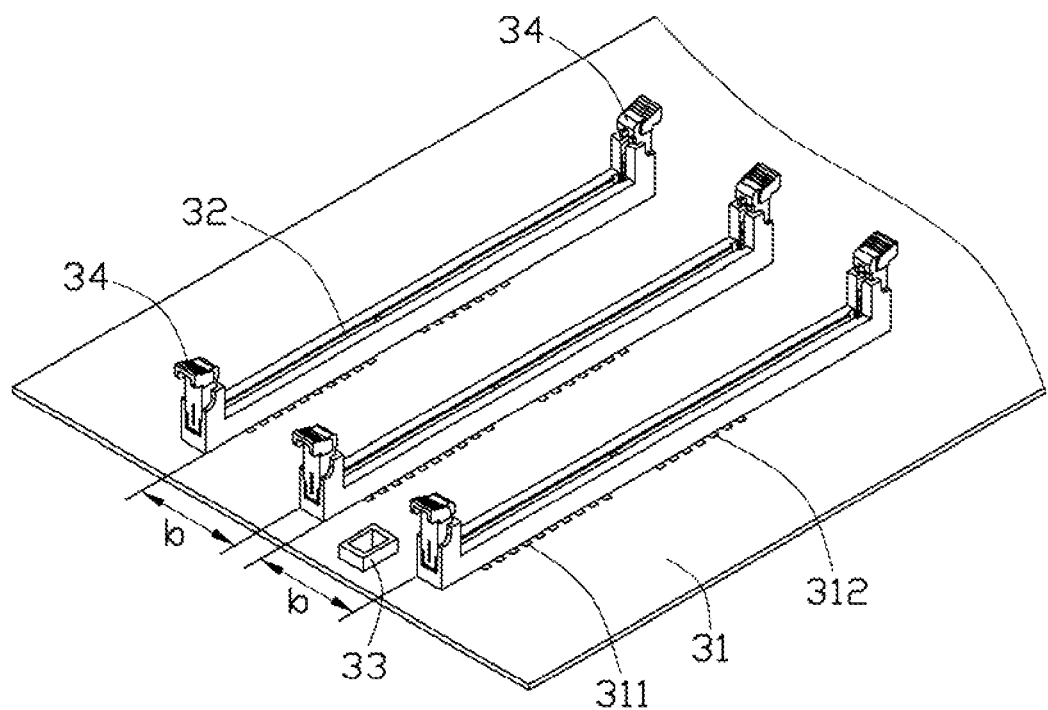
FIG. 2 is a schematic view of the motherboard of FIG. 1.

Referring to FIG. 2, the motherboard 30 includes a circuit board 31, and a plurality of memory slots 32 and a storage device interface 33 all arranged on the circuit board 31. Each memory slot 32 includes a plurality of power pins 311 and a plurality of ground pins 312. In one embodiment, the memory slots 32 may be double data rate type three (DDR3) memory slots or double data rate type two (DDR2) memory slots. The storage device interface 33 is a SATA interface. The memory slots 32 are arranged in parallel, and a distance between two adjacent memory slots 32 is b.

Figure 3:
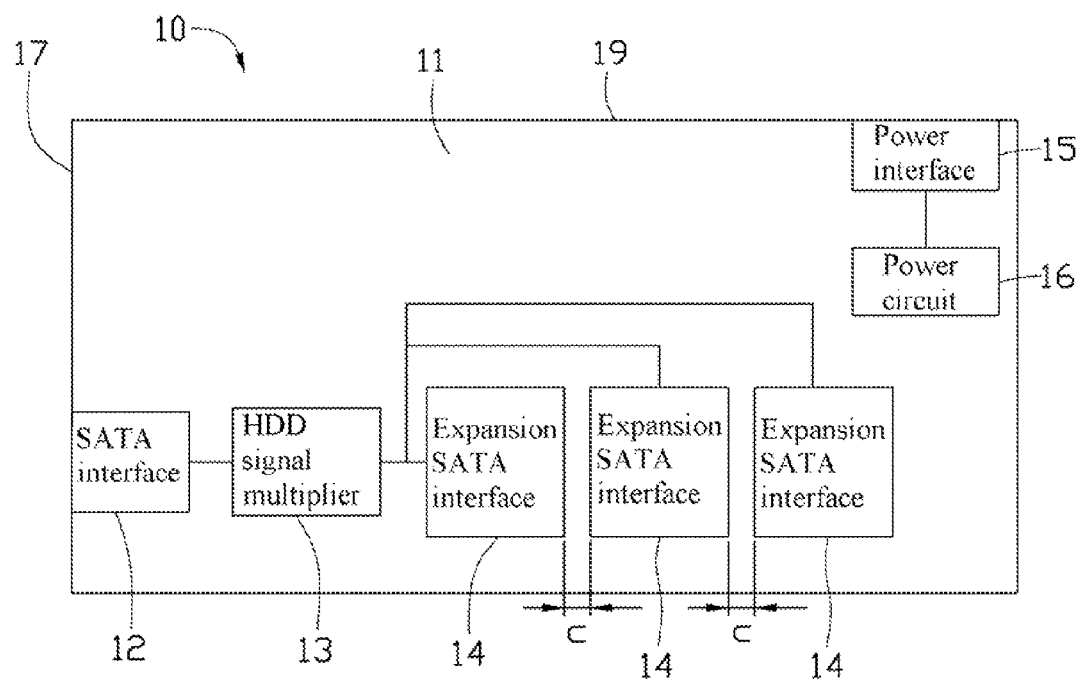
FIG. 3 is a schematic diagram of the adapter board of FIG. 1.

Referring to FIG. 3, the adapter board 10 includes a substantially rectangular circuit board 11. A SATA interface 12, a hard disk drive (HDD) signal multiplier 13, a plurality of expansion SATA interfaces 14, a power interface 15, and a power circuit 16 are all arranged on the circuit board 11. In one embodiment, the expansion SATA interfaces 14 includes three expansion SATA interfaces. The SATA interface 12 is located adjacent to a short edge 17 of the circuit board 11, to be connected to the storage device interface 33 of the motherboard 100 through a cable 4 with two interfaces. The HDD signal multiplier 13 is connected between the SATA interface 12 and each of the expansion SATA interfaces 14. The power interface 15 is arranged adjacent to a long edge 19 of the circuit board 11, to be connected to a power supply 40. The power circuit 16, which is connected to the power interface 15, receives a voltage from the power supply 40 through the power interface 15, converts the received voltage, and provides the converted voltage to the SATA interface 12, the HDD signal multiplier 13, and the expansion SATA interfaces 14. The expansion SATA interfaces 14 are arranged in parallel, and a distance between two adjacent expansion SATA interfaces 14 is c. The distance c is equal to the distance b.

Figure 4:
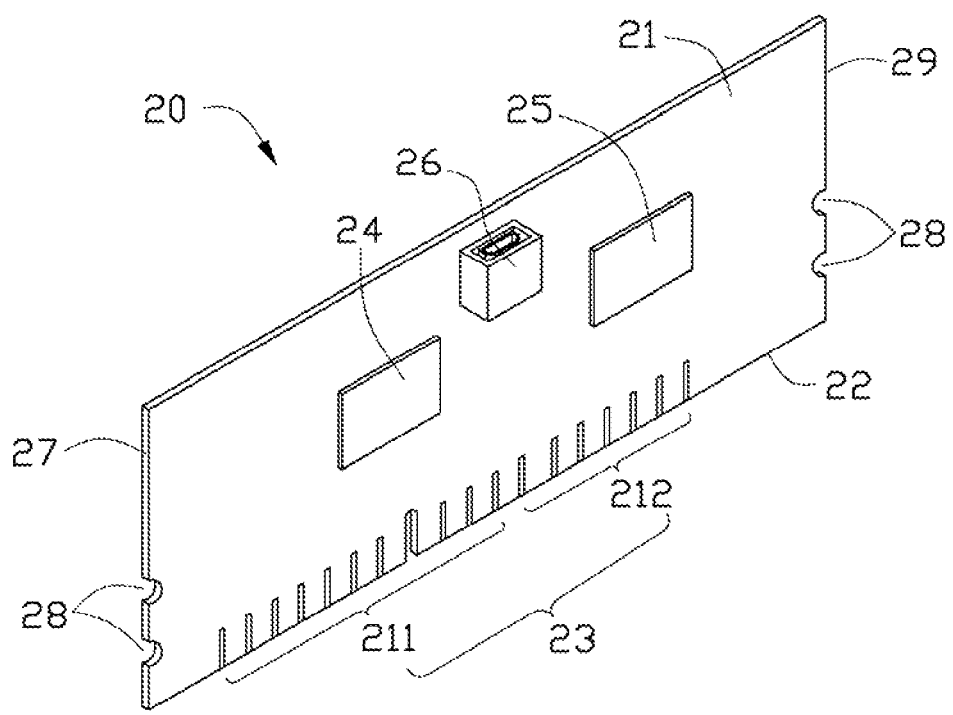
FIG. 4 is an enlarged view of the SATA DIMM of FIG. 1.

Referring to FIG. 4, each SATA DIMM module 20 includes a substantially rectangular circuit board 21. Arranged on each circuit board 21 are a control chip 24, a power circuit 25, and a connector 26 connected to the control chip 24. An edge connector 23 is set on a long edge 22 of each circuit board 21, to be inserted into one of the memory slots 32 of the motherboard 30. The edge connectors 23 each include a plurality of power pins 211 connected to the corresponding power circuit 25, and a plurality of ground pins 212 connected to a ground layer of the corresponding circuit board 21. Four grooves 28 are respectively defined in two opposite short edges 27 and 29 of each board 21. In one embodiment, each connector 26 is a SATA connector located adjacent to a top long edge of the corresponding board 21 opposite to the edge connector 23. In other embodiments, the connectors 26 may be located at other positions, such as the short edge 27 or 29 of the circuit boards 21.

Referring to FIG. 1, in assembly, the edge connector 23 of each SATA DIMM module 20 is inserted into a corresponding memory slot 32 of the motherboard 30. The power pins 211 and the ground pins 212 of each SATA DIMM module 20 are respectively connected to the power pins 311 and the ground pins 312 of the memory slots 32. The grooves 28 engage with fixing elements 34 at opposite ends of the corresponding memory slot 32, to fix the SATA DIMM modules 20 in the memory slots 32. Each expansion SATA interface 14 is connected to the connector 26 of a corresponding SATA DIMM module 20. The power interface 15 is connected to the power supply 40. The SATA interface 12 of the adapter board 10 is connected to the storage device interface 33 of the motherboard 30 through the cable 4.

In use, when the motherboard 100 receives power, the motherboard 100 outputs a voltage to the power circuit 25 of each SATA DIMM module 20 through the power pins 311 of the corresponding memory slot 32 and the power pins 211 of the SATA DIMM module 20. The power circuits 25 convert the received voltage and provide the converted voltage to the control chip 24 and other electronic elements of the corresponding SATA DIMM module 20. At the same time, the motherboard 30 outputs a control signal, such as a SATA signal, to the control chips 24 of the SATA DIMM modules 20 through the storage device interface 33, the cable 4, the adapter board 10, and the connectors 26. Therefore, the motherboard 100 can communicate with the SATA DIMM modules 20.

The motherboard 100 can communicate with a plurality of SATA DIMM modules 20 through the adapter board 10 and the storage device interface 33 set on the motherboard 30, to expand storage capacity yet conserve space.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A motherboard assembly, comprising:
   a motherboard comprising a storage device interface and a plurality of memory slots, wherein each of the plurality of memory slots comprises a plurality of first power pins and a plurality of first ground pins;
   an adapter board comprising:
      a serial advanced technology attachment (SATA) interface to be electrically connected to the storage device interface of the motherboard;
      a hard disk drive (HDD) signal multiplier connected to the SATA interface;
      a plurality of expansion SATA interfaces connected to the HDD signal multiplier; and
      a power interface to be connected to a power supply, to receive a voltage from the power supply and to provide the received voltage to the SATA interface, the HDD signal multiplier, and the plurality of expansion SATA interfaces; and
   a plurality of SATA dual-in-line memory modules (DIMMs), each of the plurality of SATA DIMM modules comprising:
      a circuit board;
      an edge connector set on a bottom edge of the circuit board to engage in a corresponding one of the memory slots of the motherboard, the edge connector comprising a plurality of second power pins corresponding to the first power pins, and a plurality of second ground pins corresponding to the first ground pins;
      a first power circuit arranged on the circuit board and connected to the plurality of second power pins of the edge connector;
      a control chip; and
      a connector arranged on the circuit board, and connected to the control chip and a corresponding one of the expansion SATA interfaces of the adapter board.

2. The motherboard assembly of claim 1, wherein an interval distance between two adjacent expansion SATA interfaces of the adapter board is equal to an interval distance between two adjacent memory slots of the motherboard.

3. The motherboard assembly of claim 1, wherein the memory slots are double data rate type three (DDR3) memory slots or double data rate type two (DDR2) memory slots, and the storage device interface of the motherboard is a SATA connector.

4. The motherboard assembly of claim 1, wherein the expansion SATA interfaces of the adapter board comprises three expansion SATA interfaces.

5. The motherboard assembly of claim 1, wherein the adapter board comprises a second power circuit, the second power circuit is connected to the power interface, to receive the voltage from the power supply through the power interface, converts the received voltage, and provides the converted voltage to the SATA interface, the HDD signal multiplier, and the expansion SATA interfaces.

6. The motherboard assembly of claim 1, wherein the SATA interface of the adapter board is located adjacent to a short edge of the adapter board, to connect the storage device interface of the motherboard through a cable.

7. The motherboard assembly of claim 1, wherein the connector of the SATA DIMM module is a SATA connector.

8. The motherboard assembly of claim 1, wherein the circuit board is rectangular, the bottom edge of the second board body is a long edge, two grooves are respectively defined in two opposite short edges of the circuit board, the memory slot further comprises two fixing elements arranged on two ends of the memory slot, the fixing elements of the memory slot engage in the grooves of the circuit board, respectively, to fix the SATA DIMM module to the memory slot.

* * * * *